No. 740,019. PATENTED SEPT. 29, 1903.
J. C. HUTTON, Jr.
HORSESHOEING STAND.
APPLICATION FILED DEC. 8, 1902.
NO MODEL.
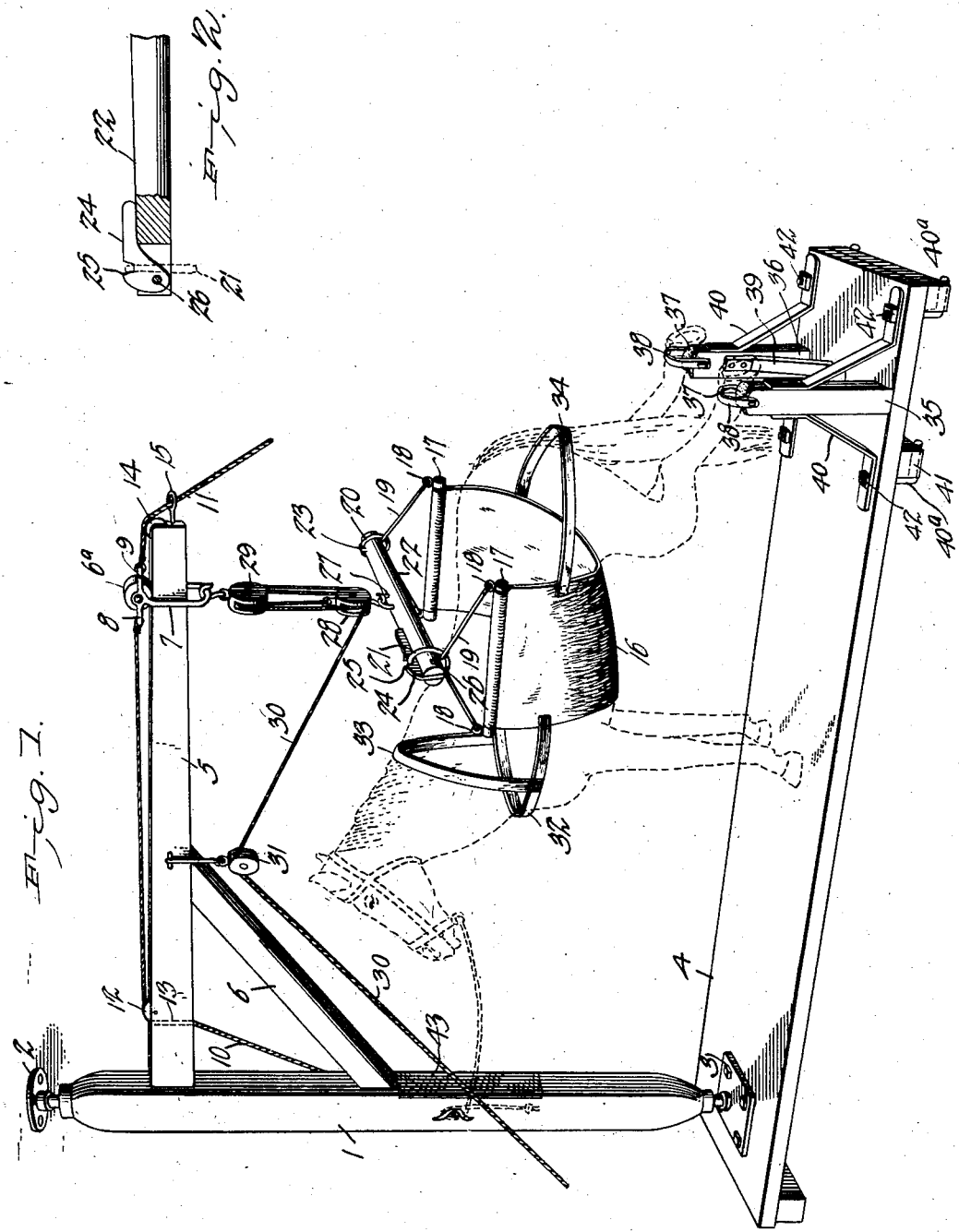
Witnesses:
J. C. Hutton, Jr., Inventor:
by
Attorneys.

No. 740,019. Patented September 29, 1903.

UNITED STATES PATENT OFFICE.

JAMES C. HUTTON, JR., OF WATERLOO, OREGON.

HORSESHOEING-STAND.

SPECIFICATION forming part of Letters Patent No. 740,019, dated September 29, 1903.

Application filed December 8, 1902. Serial No. 134,393. (No model.)

*To all whom it may concern:*

Be it known that I, JAMES C. HUTTON, Jr., a citizen of the United States, residing at Waterloo, in the county of Linn and State of Oregon, have invented a new and useful Horseshoeing-Stand, of which the following is a specification.

This invention relates to horseshoe-stands.

The object of the invention provides a structure of the character specified which shall be thoroughly effective without possibility of injury of holding a vicious horse in such position as to enable it to be shod.

With these and other objects in view, as will appear as the nature of the invention is better understood, the same consists, generally stated, in a horseshoeing-stand embodying a means for elevating the horse, foot-rests, and means for shifting the position of the animal while suspended to bring its hind feet in proper relation with regard to the foot-rest.

The invention contemplates, further, a novel form of supporting-belt and means for releasing the same from engagement with the animal when the operation of shoeing is completed.

The invention further contemplates the employment of a novel form of foot-rest and means to permit of its ready attachment to or detachment from the flooring of the room in which the structure is located when desired.

The invention consists, finally, in the novel construction and combination of parts of a horseshoeing-stand, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in these drawings—

Figure 1 is a view in perspective of a horseshoeing-stand constructed in accordance with the present invention. Fig. 2 is a sectional detail view of the belt locking and releasing device.

Referring to the drawings, 1 designates the crane-post, the terminals of which are provided with pintles stepped in bearings 2 and
3, secured, respectively, to the ceiling and flooring 4 of the room in which the structure is located. By this arrangement the crane-post will be free to rotate in a manner that will be readily understood. Secured to the upper portion of the crane-post is an arm 5, which is braced against sagging or dropping by a strut 6, secured, respectively, to the under side of the arm and to the crane-post.

Mounted to run upon the upper side of the arm 5 is a pulley $6^a$, carried by a frame comprising a yoke or loop 7, passing around the arm and operating to hold the pulley $6^a$ in operative position thereon, and two yokes 8 and 9, to which are connected two anchor-ropes 10 and 11, the rope 10 passing around a pulley 12, mounted in the slot in the upper side of the arm, and passing downward through an opening 13 in the arm, and the rope 11 passing around a pulley 14, disposed within a slot in the arm near its free end. The outer end of the arm is provided with a keeper or guide 15, through which the said rope passes.

The suspending means for the horse comprises a belt 16, constructed of canvas, leather, or any other suitable material and having its ends provided with pockets to receive poles 17. The poles have connected with them at each end eyes 18, and with each of the eyes is connected one end of a bar or chain 19, the other end of each bar being connected with rings 20 and 21, the ring 20 being permanently associated with a cross-bar 22, in this instance through the medium of a staple 23, and the ring 21 being detachably connected with the cross-bar through the medium of a trip-lever 24, pivoted in a slot in one end of the cross-bar and provided intermediate of its ends on its upper side with a recess 25, in which the ring 21 is adapted to rest. It will be seen that by disposing the recess between the end of the lever and its pivot 26 the weight of the animal will cause the operative end of the lever to bear firmly upon the cross-bar, and thus prevent the ring from becoming disconnected with the trip-lever. The cross-bar is provided intermediate of its ends with a staple or eye 27, to be engaged by the hook of a block 28, the yoke 7 being engaged by the hook of a similar block 29, and the said blocks are engaged by a hoisting-rope 30, the free end of which passes through a lead-block 31, suspended from the crane-arm.

The belt 16 has associated with it a breast-strap 32, to which is connected a neck-strap 33 and a breech-strap 34.

The foot-rest comprises two posts 35 and 36 of any desired height, the upper end of each of which is provided with a padded depression 37 to receive the ankle of the horse, straps 38, secured to the posts, operating to clamp the animal's ankles in position. These posts are connected and held at the requisite distance apart by an approximately V-shaped strut 39, and the posts are held in position upon the floor by four braces 40, the upper ends of which are secured to the posts on opposite sides thereof, and the lower end of each is outturned to rest upon the floor and receive the upper ends of anchoring-bolts 40ª, the lower ends of which are hooked under the floor-joists 41, the nuts 42, turned on the upper ends of the bolts, serving to clamp the said braces in position. By employing the anchor-bolts the foot-rest is adapted to be detached from the flooring and removed when not in use, thus to avoid occupying space which might otherwise be employed.

In the operation of the device the belt is passed under the stomach of the animal, and the ring 21 is engaged with the notch of the lever, and the latter is then turned to the position shown in Fig. 2. The hoisting-rope, which may be operated either by hand-power or windlass, is then drawn upon and the animal is lifted entirely free from the flooring. The anchor-ropes are then operated to move the animal longitudinally to bring its hind feet in proper position with relation to the foot-rests and are secured in any suitable manner, as by being engaged with cleats located at any preferred point in the building or structure in which the device is used. The ankles of the animal's hind legs are placed upon the foot-rests and the straps are secured in position. When thus suspended, the animal will be positively prevented from kicking, and as all four feet are above the flooring four men may work upon the horse at the same time, thus to reduce the period of suspension. No matter how vicious the animal may be, when suspended in the manner described he will be helpless to do any harm to the operator. As a matter of further precaution to prevent the animal from injuring himself the under side of the strut 6 and the forward side of the crane-post may be padded at 43, so that in the event that the animal struggles and his head contacts with these parts no injury will ensue.

The apparatus herein described is exceedingly simple in construction, is thoroughly efficient and durable in use, and by the arrangement and construction of the different parts provision is made to meet every emergency that might arise.

Having thus described the invention, what I claim is—

1. A horseshoeing-stand embodying means for elevating the horse, foot-rests, and means for shifting the position of the animal while it is suspended to bring its hind feet in proper relation with regard to the foot-rests.

2. A horseshoeing-stand comprising a crane, and horse-suspending means supported for longitudinal movement thereon.

3. In a horseshoeing-stand, the combination with a crane, of a yoke-carrying pulley adapted for longitudinal travel upon the crane-arm, and horse-suspending means connected with the yoke.

4. In a horseshoeing-stand, the combination with a crane, of a horse-suspending device comprising a supporting-bar suspended from the crane, a belt having one end permanently attached to the bar, and a tripping device carried by the other end of the bar with which the belt is connected.

5. In a horseshoeing-stand, the combination with a crane, of a horse-suspending device supported thereby and comprising a cross-bar carrying a trip-lever, and a suspending-belt having one end permanently associated with the bar and the other end in engagement with the trip-lever.

6. In a horseshoeing-stand, a horse-suspender comprising a cross-bar to be suspended from a crane, a belt having poles connected with its ends, and belt-supporting means connected at one end with the poles and having rings associated with their opposite ends, one of said rings being permanently connected with the bar and the other being detachably associated therewith.

In testimony that I claim the foregoing as my own I have hereto affixed my signature in the presence of two witnesses.

JAMES C. HUTTON, JUN.

Witnesses:
 HORACE KEARN,
 ROBERT ATTRIDGE.